July 4, 1967     D. I. COLE     3,329,766
ELECTRIC CABLE
Filed Aug. 12, 1965
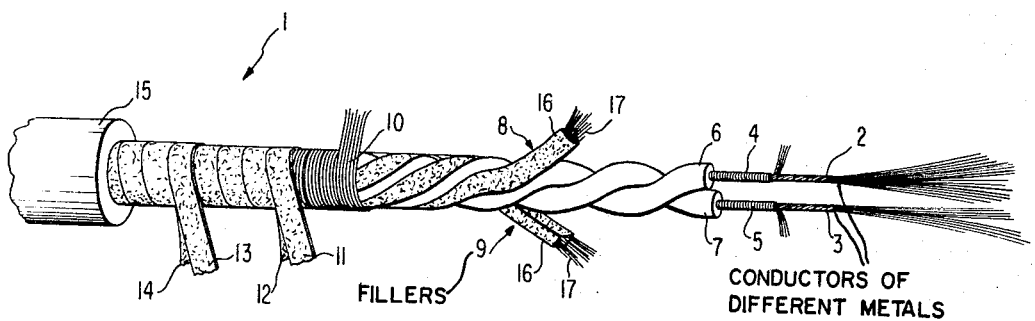
INVENTOR
DOUGLAS I. COLE
BY
ATTORNEY

United States Patent Office 3,329,766
Patented July 4, 1967

---

3,329,766
ELECTRIC CABLE
Douglas I. Cole, East Cleveland, Ohio, assignor to General Electric Company, a corporation of New York
Filed Aug. 12, 1965, Ser. No. 479,200
6 Claims. (Cl. 174—116)

The present invention relates to electric cables for use in extremely high temperatures and its principal object is to provide such cables capable of preserving circuit continuity for appreciable times in such temperatures.

In my copending application Ser. No. 421,016, filed Dec. 24, 1964, and assigned to the assignee of the present invention, an expendable immersion thermocouple unit useful in measuring the temperature of molten steel baths is disclosed and claimed.

The thermocouple unit of the copending application is intended for use in connection with furnaces for carrying out the basic oxygen process for making steel and makes possible the measurement of the temperature of the molten steel bath contained in the furnace crucible without tilting the crucible from its normally upright position.

In brief, the thermocouple unit includes a temperature sensing thermocouple element which is weighted so as to sink into the molten steel bath when dropped into the crucible and an electric cable electrically connected to the thermocouple element at one end and to a temperature measuring apparatus at its opposite end. The temperature measuring apparatus is mounted outside the furnace. A substantial length of cable attached to the thermocouple element is subjected to elevated temperatures as the weighted element drops in the crucible and plunges into the bath.

In order to obtain a temperature measurement of the steel bath in the crucible it is necessary that the thermocouple element and the cable maintain circuit continuity under these extremely elevated furnace temperatures for a time sufficient for the measuring apparatus to indicate the temperature of the molten steel bath in which the thermocouple element is immersed. The temperature of the steel bath is usually approximately 2900° F. and the portion of the cable within the crucible is subjected to elevated temperature of this order.

Failure of the cable to preserve circuit continuity under such extremely elevated temperatures for a time sufficient for making a temperature measurement of the molten steel bath has occurred heretofore with sufficient frequency to present a vexacious problem.

I have discovered that the cause of the difficulty with cables that have failed in such service is the presence of air in the cable in sufficient amount to cause disruption of the cable under the heat of the furnace by the rapid expansion of the contained air or by combustion of the internal organic insulation parts in the air within the cable. I have discovered that insulation material, such as uncured rubber, which gives off gaseous matter under the furnace heat increases the risk of disruption of the cable by the rapid build up of pressure therewithin.

Having discovered the cause of the difficulty, I have solved the problem by minimizing the content of combustion supporting gas, such as air, and material capable of generating gaseous matter within the cable to the extent that failure of the cable to maintain circuit continuity in such service is eliminated.

In the single figure of the drawing accompanying and forming part of this specification, an embodiment of the invention is shown in a perspective view with parts thereof broken away to illustrate the internal structure of the cable.

Referring to the drawing, the cable 1 comprises two stranded conductors 2 and 3 each helically wrapped tightly with cotton strands forming insulating layers 4 and 5, respectively. Coats 6 and 7 of flexible rubber insulation cover the wrapped conductors 2 and 3, respectively. The coats 6 and 7 are of different colors for distinguishing between the conductors 2 and 3. The rubber coated insulated conductors are twisted together tightly as shown and fillers 8 and 9 are laid tightly in the valleys between the twisted pair of insulated conductors. A tightly wound layer 10 of cotton threads covers the insulated conductors and the fillers and binds these parts closely together. Four paper strips 11, 12, 13 and 14 are helically wound in overlaying pairs over the layer 10. An outer sheath 15 of flexible rubber covers the entire structure described above.

The advantages of the invention are obtained by tightly wrapping the cotton and paper insulation of the cable about the respective pairs protected thereby, by extruding the rubber insulation closely on the parts covered thereby and by curing the rubber of the coats 6 and 7 and the sheath 15 immediately after extrusion.

Electric cables were constructed by stranding sixteen copper wire strands each 0.010 inch in diameter to make a No. 18 gauge conductor 2. Seven copper 2% nickel alloy wire strands each 0.010 inch in diameter were stranded to make conductor 3. Conductors 2 and 3 were helically wrapped with fine strands of cotton to form the layers 4 and 5. The rubber coats 6 and 7 were extruded over the wrapped conductors 2 and 3. The rubber was cured immediately after extrusion by subjection to steam and pressure for a time sufficient to drive off volatile matter and eliminate voids. Each of the insulated conductors then had a diameter of 0.111 inch with the coat 7 being thicker than the coat 6.

The two insulated conductors were then tightly twisted together and two fillers 8 and 9 were laid into the valleys between the twisted conductors. The fillers each consisted of paper 16 twisted on cellulose threads 17 and were compacted tightly in the valleys by rotating the supporting spools in the opposite direction from that in which the insulated conductors were twisted.

The cable was then wound tightly with cotton threads in side-by-side position to form the layer 10. The paper strips 11, 12, 13 and 14 each 0.004 inch in thickness were drawn tightly around the twisted members and were laid in pairs as shown in the drawing in such manner as to provide four layers of paper on the cable. The outer sheath 15 of rubber 0.074 inch in wall thickness was then extruded over the above-described structure and cured immediately after extrusion as described above to complete the cable. The completed cable was 0.386 inch in diameter.

The sheath 15 and the coats 6 and 7 consisted of styrene butadiene synthetic rubber containing non-volatilizing coloring matter, the coat 6 and the sheath 15 contained carbon black and the coat 7 a monoazo type organic red dye.

The electric cable made as described above is of dense, close structure having a multiplicity of tight layers of organic insulating material around the metal conductors 2 and 3. The close, tight structure of the cable minimizes the content of interstitial air therein. A minimum content of air is advantageous because this minimizes both the likelihood of the cable being ruptured by the quick expansion of trapped air under the extreme heat of the furnace crucible and the molten steel bath and the possibility of the utility of the cable being destroyed by combustion of its internal organic insulation at temperatures exceeding the ignition temperature in air of the organic insulation.

In the absence of combustion supporting air within the cable, the organic insulation of the cable roasts rather than burns. The roasting of the insulation proceeds from the outer layers inwardly and as each successive layer is roasted it forms a protective layer of carbon or char for the succeeding layers of insulating material. The roasting process proceeds at a slower rate than a burning process so that the insulation layers of the cable retain their original characteristics for an appreciable longer time when roasted rather than burned.

The cured rubber of parts 6, 7 and 15 minimizes the generation of gaseous material within the cable under elevated temperatures to further reduce the build up of internal pressures.

In the specific structure of the cable 1 described above, when the cable extends from the top of the furnace crucible into the bath of molten steel the part of the sheath 15 immersed in the molten steel does not burn due to the absence of combustion supporting gas in the molten metal but rather chars to form a layer of carbon offering protection to the layers of paper insulation formed by the paper strips 11 to 14. These strips overlying each other may also be roasted and charred in succession to form carbon layers offering additional protection to the underlying parts of the cable.

The internal parts of the cable extending between the molten metal bath and the top of the crucible are protected in like manner.

The part of the outer sheath 15 exposed to the furnace atmosphere above the molten steel bath may or may not burn depending on the composition of the atmosphere within this part of the crucible but in either case a charred layer is formed thereby for the protection of the internal parts of the cable.

Lengths of the cable 1 embodying the invention were included in thermocouple units of the type described above and used in making temperature measurements of molten steel baths in the crucibles of furnaces of the basic oxygen process type. The temperature sensing thermocouple element of the unit consisted of a wire of platinum having one end joined to an end of a wire consisting of an alloy of platinum with 2% rhodium to form a temperature sensing junction. The conductor 2 of the cable 1 consisting of stranded copper wire was electrically connected to the platinum-rhodium alloy wire of the thermocouple element and the conductor 3 of stranded copper 2% nickel alloy wire was electrically connected to the platinum wire of the thermocouple element to avoid the introduction of extraneous E.M.F.'s into the measuring circuit. In each of such tests, the cable 1 successfully maintained circuit continuity for at least eight seconds with the temperature sensing thermocouple element immersed in the molten steel bath and the cable exposed to the molten steel of the bath and to the atmosphere above the bath in the crucible of the furnace. Temperature measurements were successfully made in each of these tests.

In contrast, cables of looser structure containing air in appreciable volume and including uncured rubber insulation or material, such as asbestos, which disintegrates at such high temperatures, invariably failed to preserve circuit continuity for the required time. Also, cables of looser structure free from asbestos and wherein the rubber insulation was cured but in which air was present in appreciable amounts failed frequently. Such failures, of course, increase the cost of making temperature measurements in the manufacture of steel not only due to the cost of the thermocouple units which fail but also due to the risk of producing steel of undesired composition due to failure of determining the temperature of the molten steel bath at the proper time intervals.

The cable 1 of the present invention even though charred to a considerable extent is coherent, self-supporting and retains sufficient strength after the temperature measurement has been made in the manner described above that it may be withdrawn entirely from the furnace crucible together with the thermocouple element. The weight is attached to the thermocouple element in such manner that a slight tug on the cable is sufficient to free the thermocouple element from the weight while in the bath and after the temperature measurement has been made.

This feature of the cable 1 is advantageous in that a suitable vessel may be secured to the immersion end of the cable for securing a sample of the molten steel bath. A suitable vessel for this purpose is disclosed and claimed in my copending application Ser. No. 449,065, filed Apr. 20, 1965 and assigned to the assignee of the present invention. As disclosed and claimed in the copending application, the steel sampler is affixed to the cable immediately above the thermocouple element and is filled with molten steel from the bath while the temperature measurement is being made. After the making of the temperature measurement the cable together with the steel sampler and the thermocouple element may be entirely withdrawn from the furnace crucible and the sample of steel in the steel sampler examined in the usual manner for determining the composition of the molten steel in the bath.

While a species of the invention has been shown and described, it will be understood that other materials and techniques may be used in producing the cable without departure from the spirit and scope of the invention as defined in the following claims. For example, stranded jute may be used for the fillers 8 and 9. Fine strands of steel may be used in place of the cellulose threads 17 in the fillers to increase the strength of the cable. Other insulating materials similar to those described above may be used which pack tightly and techniques which tend to tightly pack such materials within the cable are suitable.

What I claim as new and desire to secure by Letters Patent of the United States is:

1. An electric cable capable of forming a coherent self-supporting charred residue on exposure to temperatures in excess of the charring temperature in a non-oxidized atmosphere, which comprises a pair of stranded wire conductors mutually insulated and twisted together, compacted fillers of organic insulation material in the valleys between the conductors, a plurality of layers of readily combustible organic electrically insulating material around said conductors and said fillers and a sheath of cured flexible rubber, the layers of insulation material being tightly wound around and binding closely together said insulated conductors and said compacted fillers and said sheath conforming closely to said layers to minimize the content of interstitial air within the cable and combustion of the layers of combustible insulating material internally of the sheath at temperatures exceeding the ignition temperature in air of the combustible insulating material.

2. An electric cable according to claim 1 wherein the conductors include a different number of strands and wherein the strands of the conductor including the larger number of strands consist of copper and the strands of the other of said conductors consist of copper nickel alloy.

3. An electric cable according to claim 1 wherein the layers of insulation material include a binding layer of cotton threads covering the conductors and the fillers and a plurality of paper strips covering the cotton threads.

4. An electric cable according to claim 1 wherein the fillers include cable strengthening metal wires.

5. An electric cable capable of forming a coherent self-supporting charred residue on exposure to temperatures in excess of the charring temperature in a non-oxidizing atmosphere, which comprises a pair of stranded wire conductors mutually insulated and twisted together, compacted fillers of organic insulation material in the valleys between the conductors, cable strengthening metal wires within the fillers, a plurality of layers of readily combustible organic electrically insulating material around said conductors and said fillers and a sheath of cured flexible rubber, the layers of insulation material being tightly wound around and binding closely together said insulated conductors and said fillers and said sheath conforming closely to said layers to minimize the content of interstitial air within the cable and combustion of the layers of combustible insulating material internally of the sheath at temperatures exceeding the ignition temperature in air of the combustible insulating material, said conductors including a different number of strands and the strands of the conductor including the larger number of strands consisting of copper and the strands of the other of said conductors consisting of copper nickel alloy, said layers of insulation material including a binding layer of cotton threads covering the conductors and the fillers and a plurality of paper strips covering the cotton threads.

6. An electric cable comprising a pair of stranded wire conductors mutually insulated and twisted together, a plurality of layers of readily combustible organic electrically insulating material around said conductors and a closely conforming sheath of cured flexible rubber, said conductors including a different number of strands, the strands of the conductor including the larger number of strands consisting of copper and the strands of the other of said conductors consisting of copper nickel alloy.

References Cited

UNITED STATES PATENTS

| 1,904,472 | 4/1933 | Kent | 174—116 X |
| 2,963,532 | 12/1960 | Bell | 136—234 |

FOREIGN PATENTS

| 352,327 | 7/1931 | Great Britain. |

LEWIS H. MYERS, *Primary Examiner.*

E. GOLDBERG, *Assistant Examiner.*